(12) United States Patent
Lee

(10) Patent No.: US 6,391,221 B1
(45) Date of Patent: May 21, 2002

(54) METHOD FOR REMOVING THE THERMAL-HARDENED FRIT SEAL TO BE USED FOR ASSEMBLING ELECTRONIC PARTS

(76) Inventor: Ki Won Lee, 108-10 Il-dong, Ansan-si, Kyunggi-do (KR)

( * ) Notice: Subject to any disclaimer, the term of this patent is extended or adjusted under 35 U.S.C. 154(b) by 0 days.

(21) Appl. No.: 09/582,540
(22) PCT Filed: Dec. 24, 1998
(86) PCT No.: PCT/KR98/00460
§ 371 Date: Jun. 28, 2000
§ 102(e) Date: Jun. 28, 2000
(87) PCT Pub. No.: WO99/34388
PCT Pub. Date: Jul. 8, 1999

(30) Foreign Application Priority Data

Dec. 29, 1997 (KR) .............................................. 97/75878

(51) Int. Cl.[7] .............................. B44C 1/22; C23F 1/00
(52) U.S. Cl. ................................. 216/97; 134/3; 134/24
(58) Field of Search .............................. 216/97, 88.108; 134/3, 24

(56) References Cited

U.S. PATENT DOCUMENTS 4,952,185 A * 8/1990 Lee ................................ 445/2

* cited by examiner

Primary Examiner—Randy Gulakowski
Assistant Examiner—Shamim Ahmed
(74) Attorney, Agent, or Firm—Ostrolenk, Faber, Gerb & Soffen, LLP

(57) ABSTRACT

A method for effectively removing the thermal-hardened frit seal (solder glass) which is used for assembling the electronic parts is disclosed. By utilizing the solution which contains sulfonic acid ion, the frit seal can be effectively removed without generating the noxious gas. Additionally there are merits of reducing the discharge volume of wastes and conveniences of wastes treatment.

8 Claims, 2 Drawing Sheets

(A)

(B)

(C)

(D)

(E)

(F)

METHOD FOR REMOVING THE THERMAL-HARDENED FRIT SEAL TO BE USED FOR ASSEMBLING ELECTRONIC PARTS

BACKGROUND OF THE INVENTION

1. Field of the Invention

This invention relates to a method for removing the thermal-hardened frit seal to be used for assembling electronic parts. More specifically, the present invention relates to a method for removing the sealing material which is a kind of glass compound and is thermal-hardened by crystallization when soldering the parts.

2. Description of the Prior Art

This sealing material to be called as solder glass is also named as frit glass usually in the electronics industry.

The solder glass is widely used for sealing of panel and funnel which are parts of CRT(Cathode-Ray Tube), X-ray Tube, semiconductor chips, Integrated Circuits, etc.

When assembling the pads, glass compound can be used for sealing material. During sealing process, the glass compound to be placed between the parts is crystallized and hardened by heat, and then the parts can be completely sealed.

For example, in case of CRT, the composition of the glass compound($PbO$—$B_2O_3$—$ZnO$) to be used for sealing the panel and funnel is $PbO$(75 to 82%), $B_2O_3$(6.5 to 12%), $ZnO$(7 to 14%), $SiO_2$(1.5 to 3%), $Al_2O_3$(0 to 3%) and sometimes $BaO$, $Na_2O$, $LiO_2$(0.2 to 2%) can be additionally contained.

Also the other composition of the glass compound ($ZnO$—$B_2O_3$—$SiO_2$) is $ZnO$(60 to 70%), $B_2O_3$(19 to 25%), $SiO_2$(10 to 30 16%), and $Al_2O_3$ and $MgO$(2 to 2.5%) to be sometimes additionally contained.

The paste to be prepared by mixing the glass compound powder ($PbO$—$B_2O_3$—$ZnO$) with the special solution(for example, 1% isoamylacetate of nitrocelluous), is spread on the sealing place of funnel, and the panel is put onto the sealing place of funnel. When heating at the speed of 7 to 10° C. per minutes up to 440° C., the glass compound is melted and crystallized at 440° C. for one hour. $PbO$ as a component of glass compound is changed to be $Pb_3O_4$ at 370° C.

The assembled panel and funnel(to be called as Bulb) is continuously processed to the next steps but there would be the defective bulbs during the process. These defective bulbs are collected and salvaged for re-use. For salvage, the panel and funnel should be separated and the crystallized sealing material (Frit) which is remaining in the panel/funnel should be removed. Conventionally diluted $HNO_3$ solution(12 to 17%) is used for removing the frit and the method for removing the frit by using $HNO_3$ is explained as follows.

FIG. 1 is the cross-sectional view of the frit in the panel and funnel (1a, 1b, 1c).

FIG. 2 is the enlarged cross-sectional view of frit (1a1b1c).

FIG. 3 is the process flow of separating of panel/funnel and removing of frit. FIG. 3(A) is showing the spray of $HNO_3$ by nozzle (2a). The temperature of $HNO_3$ solution is 35 to 70° C. and the frit (1a) is removed by spraying for 2 to 4 minutes. FIG. 3(B) is showing that the frit (1a) is removed while the frit (1b) and (1c) still exist. FIG. 3(C) is showing the process of separation by using the hot water (nozzle 2b, 50 to 70° C.) and cold water (nozzle 2c, 7 to 20° C.). FIG. 3(D) is showing the removing of the remaining frit(1b, 1c) of panel and funnel which are dipped in the heated $HNO_3$ solution and air bubbling method is used. FIG. 3(E) is showing another method for removing the remaining frit (1b, 1c) of panel and funnel by direct spray of $HNO_3$ to the frit. FIG. 3(F) is showing the panel and funnel, the remaining frit of which are already removed.

An inspection is done after removing the frit, and if any remaining frit is found, such frit is removed again by mechanical polishing.

During the frit removing process as above, lead oxide and other oxides are reacting with $HNO_3$ to be changed as lead nitrates and other nitrates which are dissolved in the solution.

The frit removing process needs spraying and bubbling of heated $HNO_3$ solution, such condition of which causes the generating of the fume of nitric oxides ($NOx:NO_1$ $NO_2$). This fume is hazardous and corrosive that it should be properly collected and treated, for which the investment cost for protecting air pollution is needed.

A need to develop the substitute material of $HNO_3$ in order not to generate NOx gas. Also total-nitrogen content of discharge water should be reduced according to the environment protection law.

The chemical reaction formulas between $HNO_3$ and solder glass($Pb_2O_4$, $ZnO$, $Al_2O_3$, $BaO$) are as follows.

$$6HNO_3+Pb_3O_4 \rightarrow 3Pb(NO_3)_2+3H_2O+1/2O_2 \quad (1)$$

$$2HNO_3+ZnO \rightarrow Zn(NO_3)_2+H_2O \quad (2)$$

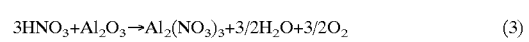

$$3HNO_3+Al_2O_3 \rightarrow Al_2(NO_3)_3+3/2H_2O+3/2O_2 \quad (3)$$

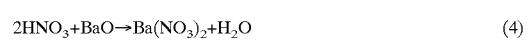

$$2HNO_3+BaO \rightarrow Ba(NO_3)_2+H_2O \quad (4)$$

Above formulas show the substitution reaction between $H^+$ of $HNO_3$ and metal ion. In addition to this chemical reaction, physical method such as stirring, air bubbling, spraying, ultrasonic, etc. to the $HNO_3$ solution accelerates the generation of NOx. The reaction formulas are as follows.

$$2HNO_3 \rightarrow H_2O+NO_2+NO_2+O_2 \quad (5)$$

$$NO+1/2O_2 \rightarrow NO_2 \quad (6)$$

By reacting as above shown formulas, the consumption of $HNO_3$ is fast while generating metal nitrates in the solution and NOx gas in the air. Thus the concentration of solution is fast decreasing and life time of solution is shortened.

Hence it is another important subject to improve the solution life time and accordingly to reduce the volume of wastes.

SUMMARY OF THE INVENTION

Therefore it is an object of the present invention to provide a method to remove the frit without generating nitric oxides.

It is another object of the present invention to provide a method to extend the using life time of solution and to minimize the volume of wastes in the frit removing process.

In achieving the above objects, the method for removing the sealing material(solder glass or frit glass) in the manufacturing process of electronic parts, comprising the step of:

treating the sealing material with the acid or the salt which is containing sulfonic acid ion.

BRIEF DESCRIPTION OF THE DRAWINGS

The above objects and other advantages of the present invention will become more apparent by describing in detail the preferred embodiment of the present invention with reference to the attached drawings in which.

DETAILED DESCRIPTION OF THE PREFERRED EMBODIMENT

In this invention, organic acid, organic salt, inorganic acid, inorganic salt, all of which are containing sulfonic acid ion, of this invention is reacting with $Pb_3O_4$, $ZnO$, $Al_2O_3$, $BaO$(the components of solder glass) which are changed to metal salt by substitution reaction. For example, the reaction formulas between sulfamic acid and metal oxides are as follows.

$$6HOSO_2NH_2 + Pb_3O_4 \rightarrow 3Pb(OSO_2NH_2)_3 + 3H_2O + 1/2O_2 \quad (7)$$

$$2HOSO_2NH_2 + ZnO \rightarrow Zn(OSO_2NH_2)_2 + H_2O \quad (8)$$

$$2HOSO_2NH_2 + Al_2O_3 \rightarrow 2Al(OSO_2NH_2)_2 + 3/2H_2O + 3/2O_2 \quad (9)$$

$$2HOSO_2NH_2 + BaO \rightarrow Ba(OSO_2NH_2)_2 + H_2O \quad (10)$$

As shown in above formulas, $H^+$ ion of sulfamic acid is replaced by metal ion, and the noxious gas does not generate under this reaction.

For example, in case of p-toluene sulfonic acid ($CH_3C_6H_4SO_3H$) which is a kind of sulfonic Acid, $H^+$ ion is replaced by metal ion.

For example, in case of ammonium sulfamate ($NH_4OSO_2NH_2$) which is a kind of sulfonate, $NH_4^+$ ion is replaced by metal ion.

The solution of sulfamic acid is a stable solution with high degree of ionization, and if slowly heated at the room temperature, it is hydrolyzed to be ammonium bisulfate ($NH_4HSO_4$).

Now the present invention will be described based on actual example.

EXAMPLES

<Example 1>
Comparison of Frit Dissolving Ability

This example is to compare the frit removing result between the comparative solution($HNO_3$) and the solutions according to this invention. 15%-$HNO_3$, 10%-$HOSO_2NH_2$, 10%-$CH_3C_6H_4SO_3H$ were prepared and the frit was treated with the solutions under different conditions of temperature and frit places. Also the treating time was measured.

According to test result, sulfamic acid is excellent in treating speed. In case of temperature conditions, the treating speed of $HNO_3$ is slow in the lower temperature.

The test result was made as below-shown tables 1 to 4.

TABLE 1

Figure 1:
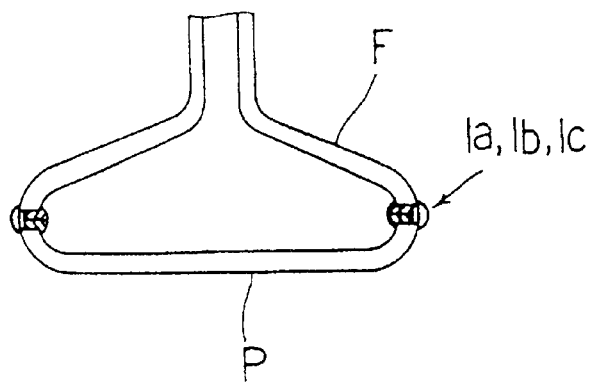
FIG. 1 is a cross-sectional view of the frit of the panel and funnel(1a, 1b, 1c).
Figure 2:
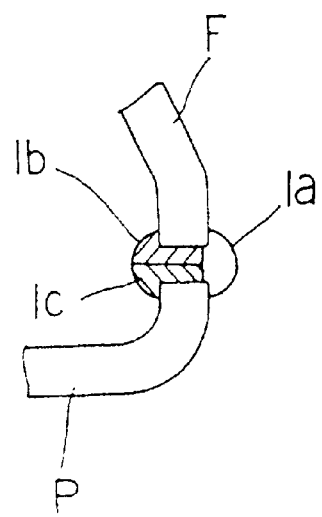
FIG. 2 is an enlarged cross-sectional view of the frit(1a, 1b, 1c) of FIG. 1.
Figure 3:
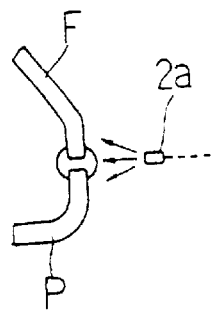
FIG. 3 is a process flow of the separation of panel/funnel and of the removing of the frit ((A), (B), (C), (D), (E), (F)) of FIG. 2.
Figure 3:
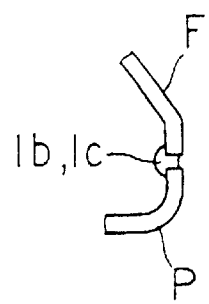
Figure 3:
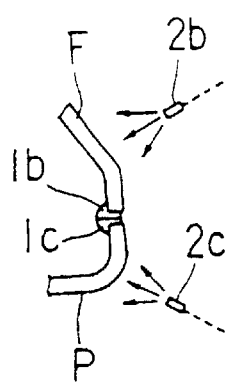
Figure 3:
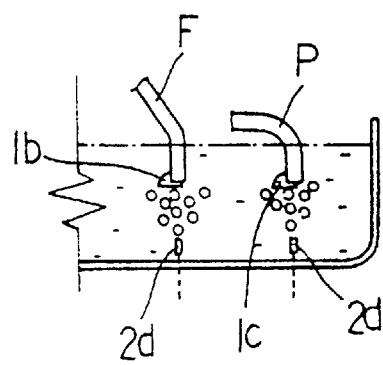
Figure 3:
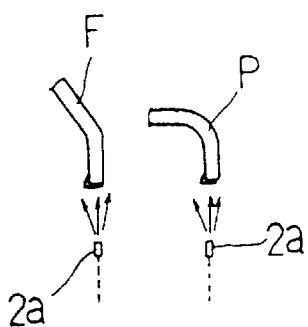
Figure 3:
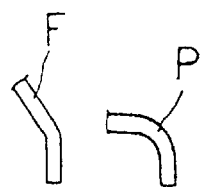

Removing the frit 1a of FIG. 2 by Spraying method

| Solution | Time for removing (minutes) 25° C. | Time for removing (minutes) 45° C. | Removed Frit Q'ty gram/500 ml (in case of 45° C.) |
|---|---|---|---|
| 15% $HNO_3$ | 5 | 3 | 24.0 |
| 10% Sulfamic Acid | 3 | 2.5 | 55.0 |

TABLE 1-continued

Removing the frit 1a of FIG. 2 by Spraying method

| Solution | Time for removing (minutes) 25° C. | Time for removing (minutes) 45° C. | Removed Frit Q'ty gram/500 ml (in case of 45° C.) |
|---|---|---|---|
| 10% Toluen Sulfonic Acid | 4 | 3 | 50.0 |

TABLE 2A

Removing the frit 1a of FIG. 2 by Ultrasonic method

| Solution | Time for removing (minutes) 25° C. | Time for removing (minutes) 45° C. | Removed Frit Q'ty gram/500 ml (in case of 45° C.) |
|---|---|---|---|
| 15% $HNO_3$ | 3.5 | 2 | 36.0 |
| 10% Sulfamic Acid | 2.5 | 2 | 60.7 |
| 10% Toluen Sulfonic Acid | 3.5 | 2.5 | 55.0 |

TABLE 2B

Removing the frit 1a of FIG. 2 by Ultrasonic method

| Solution | Time for removing (minutes) 25° C. | Time for removing (minutes) 45° C. | Removed Frit Q'ty gram/500 ml (in case of 45° C.) |
|---|---|---|---|
| 15% $HNO_3$ | 4.0 | 2 | 36.0 |
| 10% Sulfamic Acid | 2.5 | 2 | 58.5 |
| 10% Toluen Sulfonic Acid | 4.0 | 2.5 | 55.0 |

TABLE 3

Removing the frit 1b and 1c of FIG. 2 by Bubbling method

| Solution | Time for removing (minutes) 25° C. | Time for removing (minutes) 45° C. | Removed Frit Q'ty gram/500 ml (in case of 45° C.) |
|---|---|---|---|
| 15% $HNO_3$ | 16 | 8 | 28.0 |
| 10% Sulfamic Acid | 9 | 7 | 56.7 |
| 10% Toluen Sulfonic Acid | 10 | 8 | 53.0 |

TABLE 4

Removing the frit 1b and 1c of FIG. 2 by liguid circulation and stirring.

| Solution | Time for removing (minutes) 25° C. | Time for removing (minutes) 45° C. | Removed Frit Q'ty gram/500 ml (in case of 45° C.) |
|---|---|---|---|
| 15% $HNO_3$ | 18 | 8 | 36.0 |
| 10% Sulfamic Acid | 6 | 4 | 60.5 |
| 10% Toluen Sulfonic Acid | 12 | 8 | 58.0 |

As shown in above tables, the removed frit quantity of 10% sulfamic acid is the most superior(55 to 60.5 grams) while that of 15% $HNO_3$ is 24 to 36 grams only.

\<Example 2\>

Comparison of Frit Dissolving Ability According to the Concentration of Solutions Different concentration of $HNO_3$, $HOSO_2NH_2$, $CH_3C_6H_4SO_3H$ were prepared and the frit $1b$ and $1c$ of FIG. 2 were treated with the solutions by method of liquid circulation and stirring. And the frit removing time was measured.

TABLE 5

| conc. (%) | Solution | | |
|---|---|---|---|
| | Frit Removing Time of $HNO_3$ (minutes) | Frit Removing Time of $HOSO_2NH_2$ (minutes) | Frit Removing Time of $CH_3C_6H_4SO_3H$ (minutes) |
| 5 | 15 | 5 | 6 |
| 10 | 10 | 4 | 8 |
| 15 | 8 | 4 | 8 |
| 20 | 16 | 4 | 8 |

As shown in above table, frit removing speed of sulfamic acid is the most superior among the three solutions and the removing speed has not so much difference according to the concentration ratio of solution. But in case o Nitric Acid, the removing speed has much difference according to the concentration ratio.

In case of $NO_3$, the concentration should be maintained at 12 to 17% in the production line, and if the concentration is not properly maintained, the frit removing result is not stable.

\<Example 3\>

Measurement of Dissolving Amount of Lead Oxide and Zinc Oxide in Sulfamic Acid Solution This example is to compare between the actual measurement of dissolving amount of lead oxide and zinc oxide by the solution of this invention and the theoretical figures to be calculated from the chemical reaction formula.

The reaction formula between sulfamic acid and lead oxide and zinc oxide is shown as before-mentioned Formulas 7 and 8.

$$6HOSO_2NH_2 + Pb_3O_4 \rightarrow 3Pb(OSO_2NH_2)_3 + 3H_2O + 1/2O_2 \quad (7)$$

$$2HOSO_2NH_2 + ZnO \rightarrow Zn(OSO_2NH_2)_2 + H_2O \quad (8)$$

As shown in above formulas, mol ratio in the reaction of sulfamic acid with lead oxide and zinc oxide is respectively 6:1 and 2:1.

Because 1 mol of sulfamic acid($H-OSO_2NH_2$) is 97.10 grams, 1 mol of lead oxide($Pb_3O_4$) is 685.63 grams and 1 mol of zinc oxide(ZnO) is 81.38 grams, 6 mol of sulfamic acid(6×97.1 grams) can dissolve 1 mol of $Pb_3O_4$(685.63 grams) and 2 mol of sulfamic acid (2×97.1 grams) can dissolve 1 mol of ZnO(81.38 grams).

In order to check and compare, test was made by preparing each 100 ml of 10 wt % sulfamic acid solution (10 grams of sulfamic acid +100 ml of D.I.water) in 2 beakers. Powder type of lead oxide and zinc oxide were separately put into the each beaker and stirred for dissolving. The measurement of dissolving amount was as follow.

TABLE 6

| | Dissolving amount per 100 ml of sulfamic Acid 10 wt % |
|---|---|
| Lead Oxide ($Pb_3O_4$) | 11.6 grams |
| Zinc Oxide (ZnO) | 4.15 grams |

As shown in the above table, the actual measuring amount is almost same as theoretical calculation figures of Formula 7(theoretical calculation 11.77 grams in case of lead oxide, and 4.19 grams in case of zinc oxide, each in the 100 ml of 10 wt % sulfamic acid solution).

According to this invention as described above, the frit can be effectively removed without generating the noxious gas by using the solution containing sulfonic acid ion. Also the frit removing ability by the solution of this invention is bigger when comparing with $HNO_3$, which will give merits of reducing the discharge volume of wastes and conveniences of wastes treatment. Furthermore the material of this invention is available in powder type for preparing a defined amount of solution. It provides the conveniences in transportation, handling and storage.

What is claimed is:

1. A method for removing sealing material comprising solder glass or frit glass in the manufacturing process of electronic parts, comprising the step of:

treating the sealing material with an acid or a salt which contains sulfonic acid ion.

2. The method as claimed in claim 1, wherein the acid or the salt which is containing sulfonic acid ion is at least one selected from the group consisting of sulfamic acid ($NH_2SO_3H$), toluene sulfonic acid ($CH_3C_6H_4SO_3H$), sulfanilic acid ($C_6H_7NO_3S$), ammonium sulfamate ($NH_4SO_3NH_2$) and sodium sulfosalicylate ($NaO_3SC_6(OH)COOH. 2H_2O$).

3. The method as claimed in claim 2, wherein the acid or the salt which is containing sulfonic acid ion is selected from the group consisting of sulfamic acid ($NH_2SO_3H$) and toluene sulfonic acid ($CH_3C_6H_5-4-SO_3H$).

4. The method as claimed in claim 1 wherein the sealing material is PbO—ZnO glass or ZnO—$SiO_2$ glass.

5. The method as claimed in claim 1 wherein the sealing material contains lead oxide with "selected from" and in between "$Pb_3O_4$" and "or", delete PbO, $Pb_2O_3$, $Pb_3O_4$ or zinc oxide(ZnO).

6. The method as claimed in claim 1, wherein the acid or the salt which contains sulfonic acid ion is an aqueous solution having a concentration from 0.1% to saturation concentration.

7. The method as claimed in claim 6, further including at least one selected from the group consisting of oxalic acid($C_2H_2O_4$), hydrogen peroxide($H_2O_2$) and ammonium persulfate.

8. The method as claimed in claim 1, wherein the aqueous solution of the acid or the salt which contains sulfonic acid ion treated by using at least one selected from the group consisting of dipping, stirring, spraying, bubbling, ultrasonic, shaking, vibrating and rotating.

\* \* \* \* \*